United States Patent
Yang

(10) Patent No.: US 9,832,594 B2
(45) Date of Patent: Nov. 28, 2017

(54) M2M-BASED INFORMATION PROCESSING METHOD AND M2M SERVICE PLATFORM

(71) Applicant: ZTE Corporation, Shenzhen (CN)

(72) Inventor: Kun Yang, Shenzhen (CN)

(73) Assignee: XI'AN ZHONGXING NEW SOFTWARE CO.LTD., Xi'An (CN)

( * ) Notice: Subject to any disclaimer, the term of this patent is extended or adjusted under 35 U.S.C. 154(b) by 0 days.

(21) Appl. No.: 15/035,851

(22) PCT Filed: May 23, 2014

(86) PCT No.: PCT/CN2014/078340
§ 371 (c)(1),
(2) Date: May 11, 2016

(87) PCT Pub. No.: WO2014/183700
PCT Pub. Date: Nov. 20, 2014

(65) Prior Publication Data
US 2016/0316313 A1    Oct. 27, 2016

(30) Foreign Application Priority Data
Nov. 15, 2013  (CN) .......................... 2013 1 0576325

(51) Int. Cl.
*H04W 4/00* (2009.01)
*H04L 29/06* (2006.01)
(Continued)

(52) U.S. Cl.
CPC ......... *H04W 4/005* (2013.01); *H04L 65/1063* (2013.01); *H04L 65/4084* (2013.01);
(Continued)

(58) Field of Classification Search
CPC ... H04N 21/231; H04L 67/28; H04L 65/1063; H04L 65/4084; H04W 24/10; H04W 4/005
See application file for complete search history.

(56) References Cited

U.S. PATENT DOCUMENTS 6,698,021 B1    2/2004  Amini et al.
2002/0052885 A1*  5/2002  Levy ................. G06F 17/30067
(Continued)

FOREIGN PATENT DOCUMENTS

CN    102035876 A    4/2011
CN    102487488 A    6/2012
(Continued)

OTHER PUBLICATIONS

International Search Report in international application No. PCT/CN2014/078340, dated Aug. 26, 2014.
(Continued)

*Primary Examiner* — Khaled Kassim
*Assistant Examiner* — Syed S Ali
(74) *Attorney, Agent, or Firm* — Oppedahl Patent Law Firm LLC

(57) ABSTRACT

The disclosure discloses a Machine-to-Machine/Man (M2M)-based information processing method and an M2M service platform. The method includes that: video and/or environmental information data reported by an M2M terminal device is acquired; service logic processing is performed on the acquired video and/or environmental information data to obtain a video display content, and the video display content is saved in a database; and when a data request from an M2M application server is received, the database is searched for the video display content corresponding to the data request, and the video display content is fed back to the M2M application server. Another method includes that:
(Continued)

when a data request from an M2M application server is received, data is requested from an M2M terminal device corresponding to the data request; video and/or environmental information data reported by the M2M terminal device is acquired; and service logic processing is performed on the acquired video and/or environmental information data to obtain a video display content, and the video display content is sent to the M2M application server.

13 Claims, 3 Drawing Sheets

(51) Int. Cl.
*H04N 21/231* (2011.01)
*H04L 29/08* (2006.01)
*H04W 24/10* (2009.01)
*H04W 4/02* (2009.01)

(52) U.S. Cl.
CPC ........... *H04L 67/28* (2013.01); *H04N 21/231* (2013.01); *H04W 24/10* (2013.01); *H04W 4/02* (2013.01)

(56) References Cited

U.S. PATENT DOCUMENTS

| | | | | |
|---|---|---|---|---|
| 2005/0097596 | A1* | 5/2005 | Pedlow | H04N 7/1675 725/31 |
| 2008/0139195 | A1* | 6/2008 | Marsyla | H04W 24/10 455/423 |
| 2008/0199155 | A1* | 8/2008 | Hagens | H04N 7/141 386/291 |
| 2010/0049864 | A1* | 2/2010 | Lu | H04N 7/17318 709/231 |
| 2010/0299687 | A1* | 11/2010 | Bertino-Clarke | G06Q 30/0241 725/5 |
| 2010/0315964 | A1* | 12/2010 | Kim | H04L 45/121 370/252 |
| 2010/0332671 | A1* | 12/2010 | Alfonso | H04L 12/6418 709/230 |
| 2011/0157357 | A1 | 6/2011 | Weisensale | |
| 2011/0161313 | A1* | 6/2011 | Gerber | G06F 17/30206 707/723 |
| 2011/0317022 | A1 | 12/2011 | Cao | |
| 2012/0023171 | A1* | 1/2012 | Redmond | H04M 1/7253 709/205 |
| 2013/0275616 | A1 | 10/2013 | Nyberg | |
| 2014/0052770 | A1* | 2/2014 | Gran | H04N 21/26258 709/203 |
| 2014/0304756 | A1* | 10/2014 | Fletcher | H04N 21/2387 725/115 |
| 2016/0035182 | A1* | 2/2016 | Kruglick | G06F 8/61 463/29 |

FOREIGN PATENT DOCUMENTS

CN 102724773 A 10/2012
WO 2012084058 A1 6/2012

OTHER PUBLICATIONS

English Translation of the Written Opinion of the International Search Authority in international application No. PCT/CN2014/078340, dated Aug. 26, 2014.
Supplementary European Search Report in European application No. 14797610.4, dated Oct. 20, 2016.

* cited by examiner

M2M-BASED INFORMATION PROCESSING METHOD AND M2M SERVICE PLATFORM

TECHNICAL FIELD

The disclosure relates to the field of Machine-to-Machine/Man (M2M) communications, and in particular to an M2M-based information processing method and an M2M service platform.

BACKGROUND

An M2M communication network can be divided into three layers namely a perceptive extension layer, a network/service layer and an application layer in logic function.

The perceptive extension layer mainly achieves collection of physical world information, automatic recognition and intelligent control, and mainly includes an M2M terminal device. The M2M terminal device is classified into an M2M terminal having an ability to communicate with the M2M communication network and an M2M gateway having an ability to communicate with the M2M communication network and an M2M stub network.

The network/service layer supports information transfer, routing and control of the perceptive extension layer, and provides support for human-to-thing and thing-to-thing communications of the internet of things. With reference to the classification of the internet of things, a network layer specifically contains network forms such as a communication network, an internetwork and an industry network. The network/service layer mainly includes an M2M service platform.

The application layer includes various specific internet-of-things applications, and has both public service and industrial service, and the public service may be public-oriented industrial public service or may be industrial dedicated service meeting requirements for specific applications within industry. The application layer mainly includes an M2M application server, an M2M application for short.

A terminal peripheral refers to a single device such as a sensor having an environmental perception function and a data collection function, can send perceived information to the M2M service platform or the M2M application via the M2M gateway or the M2M terminal, and can also receive downlink control of the M2M application or the M2M service platform thereupon.

Tourism scenic spot video display refers to providing video content display relevant to information regarding tourism scenic spot landscapes, climate, humanity, environment and the like for users. Due to the limitations of technologies, systems and other aspects, the video display service of a tourism scenic spot multimedia information query terminal and a tourism scenic spot web portal, which are widely applied at present, locally stores collected historical video data so as to display the video data to the users, namely the video display service is limited to display only video contents which are not real-time. The demands of the users on real-time performance cannot be met, and video information and real-time environmental information data cannot be integrated.

SUMMARY

In order to solve the technical problems existing currently, the embodiments of the disclosure provide an M2M-based information processing method and an M2M service platform.

An embodiment of the disclosure provides an M2M-based information processing method, which may include that:

video and/or environmental information data reported by an M2M terminal device is acquired, the video and/or environmental information data being collected by a terminal peripheral connected to the M2M terminal device according to a pre-set parameter;

service logic processing is performed on the acquired video and/or environmental information data to obtain a video display content, and the video display content is saved in a database; and when a data request from an M2M application server is received, the database is searched for the video display content corresponding to the data request, and the video display content is fed back to the M2M application server.

Wherein, the video and/or environmental information data reported by the M2M terminal device may be carried in a service data report message, and the service data report message may further contain an identifier for the M2M terminal device reporting the video and/or environmental information data.

Wherein, a first mapping relationship between position area information and the identifier for the M2M terminal device and a second mapping relationship between the saved video display content and the identifier for the M2M terminal device may be maintained in the database, the position area information may be included in the data request from the M2M application server, and correspondingly, the step that the database is searched for the video display content corresponding to the data request may include that:

the database is searched for the first mapping relationship according to the position area information in the data request to obtain the identifier for the M2M terminal device, corresponding to the position area information, and the database is searched for the second mapping relationship according to the found identifier for the M2M terminal device to obtain the video display content corresponding to the identifier for the M2M terminal device.

An embodiment of the disclosure also provides an M2M-based information processing method, which may include that:

when a data request from an M2M application server is received, data is requested from an M2M terminal device corresponding to the data request;

video and/or environmental information data reported by the M2M terminal device is acquired, the video and/or environmental information data being collected by a terminal peripheral connected to the M2M terminal device in real time; and service logic processing is performed on the acquired video and/or environmental information data to obtain a video display content, and the video display content is fed back to the M2M application server.

Wherein, position area information may be included in the data request from the M2M application server, and correspondingly, the step that the data is requested from the M2M terminal device corresponding to the data request may include that:

a database is searched for a first mapping relationship, between the position area information and an identifier for the M2M terminal device, maintained in the database according to the position area information in the data request to obtain the identifier for the M2M terminal device, corresponding to the position area information; and the data is requested from the M2M terminal device corresponding to the found identifier for the M2M terminal device.

Wherein, the video and/or environmental information data reported by the M2M terminal device may be carried in a service data response message, and the service data response message may further contain the identifier for the M2M terminal device reporting the video and/or environmental information data; and the method may further include that:

the video display content obtained by service logic processing and the identifier for the M2M terminal device are correspondingly stored as a second mapping relationship in the database.

An embodiment of the disclosure also provides an M2M service platform, which may include:

a data acquisition unit, configured to acquire video and/or environmental information data reported by an M2M terminal device, the video and/or environmental information data being collected by a terminal peripheral connected to the M2M terminal device according to a pre-set parameter; and a service processing unit, configured to perform service logic processing on the acquired video and/or environmental information data to obtain a video display content and save the video display content in a database, and further configured to search, when a data request from an M2M application server is received, the database for the video display content corresponding to the data request, and feed back the video display content to the M2M application server.

Wherein, the video and/or environmental information data reported by the M2M terminal device may be carried in a service data report message, and the service data report message may further contain an identifier for the M2M terminal device reporting the video and/or environmental information data.

Wherein, the service processing unit may be configured to maintain a first mapping relationship between position area information and the identifier for the M2M terminal device and a second mapping relationship between the saved video display content and the identifier for the M2M terminal device in the database, search, when the data request from the M2M application server is received, the database for the first mapping relationship according to the position area information in the data request to obtain the identifier for the M2M terminal device, corresponding to the position area information, and search the database for the second mapping relationship according to the found identifier for the M2M terminal device to obtain the video display content corresponding to the identifier for the M2M terminal device.

An embodiment of the disclosure also provides an M2M service platform, which may include:

a requesting unit, configured to request, when a data request from an M2M application server is received, data from an M2M terminal device corresponding to the data request;

a data acquisition unit, configured to acquire video and/or environmental information data reported by the M2M terminal device, the video and/or environmental information data being collected by a terminal peripheral connected to the M2M terminal device in real time; and a service processing unit, configured to perform service logic processing on the obtained video and/or environmental information data to obtain a video display content, and feed back the video display content to the M2M application server.

Wherein, position area information may be included in the data request from the M2M application server, and correspondingly, the requesting unit may be configured to search a database for a first mapping relationship, between the position area information and an identifier for the M2M terminal device, maintained in the database according to the position area information in the data request to obtain the identifier for the M2M terminal device, corresponding to the position area information, and request the data from the M2M terminal device corresponding to the found identifier for the M2M terminal device.

Wherein, the video and/or environmental information data reported by the M2M terminal device may be carried in a service data response message, and the service data response message may further contain the identifier for the M2M terminal device reporting the video and/or environmental information data; and the service processing unit may be configured to correspondingly store the video display content obtained by service logic processing and the identifier for the M2M terminal device as a second mapping relationship in the database.

An embodiment of the disclosure also provides a computer readable storage medium which may include a set of instructions, the instructions being configured to execute an M2M-based information processing method according to an embodiment of the disclosure.

The M2M-based information processing methods and the M2M service platforms provided by the embodiments of the disclosure achieve acquisition of real-time video and environmental information data, so as to provide real-time and rich video display service regarding tourism scenic spots for users.

DETAILED DESCRIPTION

The technical solutions of the disclosure are further described in detail below with reference to the drawings and specific embodiments.

Figure 1:
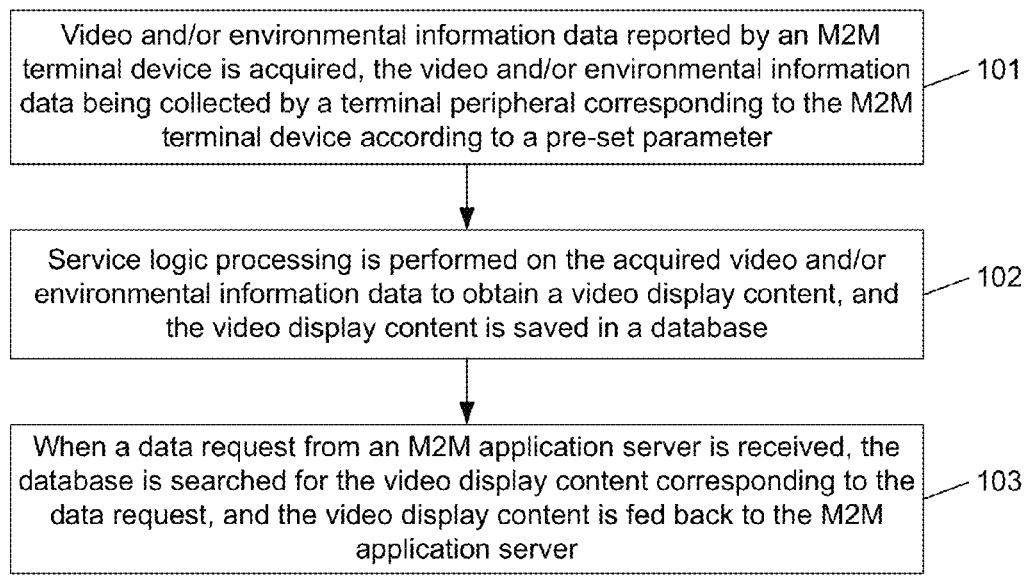
FIG. 1 is a flowchart of an M2M-based information processing method according to an embodiment of the disclosure.

As shown in FIG. 1, an M2M-based information processing method provided by an embodiment of the disclosure mainly includes the steps as follows.

Step 101: Video and/or environmental information data reported by an M2M terminal device is acquired, the video and/or environmental information data being collected by a terminal peripheral connected to the M2M terminal device according to a pre-set parameter.

An executive body of the embodiment is an M2M service platform, and therefore Step 101 is also described as that: the M2M service platform acquires the video and/or environmental information data reported by the M2M terminal device.

Wherein, the video and/or environmental information data reported by the M2M terminal device is carried in a service data report message, and the service data report message further contains an identifier for the M2M terminal device reporting the video and/or environmental information data.

Step 102: Service logic processing is performed on the acquired video and/or environmental information data to obtain a video display content, and the video display content is saved in a database.

The executive body of the embodiment is the M2M service platform, and therefore Step 102 is also described as that: the M2M service platform performs service logic processing on the acquired video and/or environmental information data to obtain the video display content, and saves the video display content in a database.

Step 103: When a data request from an M2M application server is received, the database is searched for the video display content corresponding to the data request, and the video display content is fed back to the M2M application server.

The executive body of the embodiment is the M2M service platform, and therefore Step 103 is also described as that: when receiving the data request from the M2M application server, the M2M service platform searches the database for the video display content corresponding to the data request, and feeds back the video display content to the M2M application server.

Wherein, a first mapping relationship between position area information and the identifier for the M2M terminal device and a second mapping relationship between the saved video display content and the identifier for the M2M terminal device are maintained in the database, the position area information is included in the data request from the M2M application server, and correspondingly, the step that the database is searched for the video display content corresponding to the data request includes that:

the database is searched for the first mapping relationship according to the position area information in the data request to obtain the identifier for the M2M terminal device, corresponding to the position area information, and the database is searched for the second mapping relationship according to the found identifier for the M2M terminal device to obtain the video display content corresponding to the identifier for the M2M terminal device.

Figure 2:
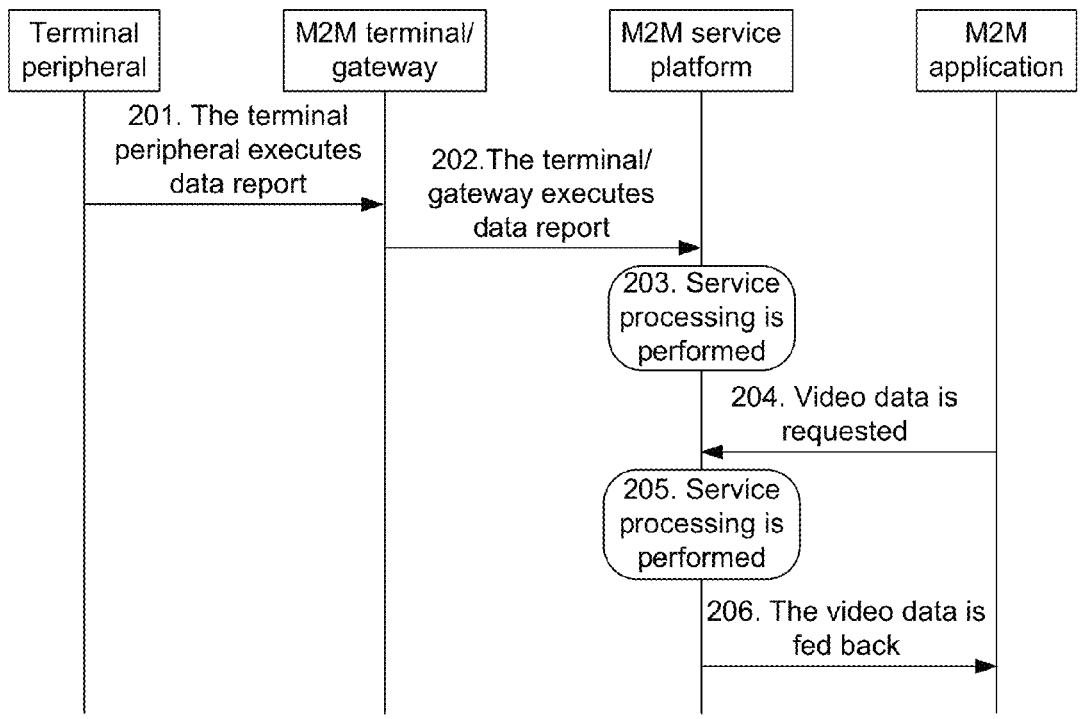
FIG. 2 is a flowchart of an information processing method according to an embodiment 1 of the disclosure.

The above information processing method is specifically explained below with reference to FIG. 2. As shown in FIG. 2, the method mainly includes the steps as follows.

Step 201: A video display terminal peripheral (hereinafter referred to as a terminal peripheral) executes collection of video and/or environmental information data according to a pre-set parameter, and reports the collected data to a video display M2M terminal/gateway (hereinafter referred to as a terminal/gateway).

The terminal peripheral may be a camera, an ultraviolet intensity sensor, a temperature sensor, a humidity sensor and other devices connected to the terminal/gateway. The camera is configured to collect video data, and the sensors are configured to collect environmental information data.

The pre-set parameter may be a time value or a time period value regarding execution of data collection/report via the terminal peripheral; the pre-set parameter may be a parameter configured directly and locally for the terminal peripheral, or may be a configuration parameter received from the M2M service platform (hereinafter referred to as a service platform). During specific implementation, a data collection/report time table can be established in a locally-stored configuration file of the terminal peripheral. An example is taken as follows.

| Execution time period | Execution time period value |
|---|---|
| 0:00-5:00 | 150 (min) |
| 5:00-8:30 | 10 (min) |
| 8:30-17:30 | 30 (min) |
| 17:30-20:00 | 10 (min) |
| 20:00-24:00 | 60 (min) |

Or

| Execution time sequence | Execution time value |
|---|---|
| #0 | 0:00 |
| #1 | 2:30 |
| #2 | 5:00 |
| #3 | 5:30 |
| #4 | 6:00 |
| ... | |
| #N | 23:00 |

Step 202: The terminal/gateway receives the video and/or environmental information data reported by the terminal peripheral, packages the data in a service data report message, and namely sends the video and/or environmental information data, serving as a cell of the service data report message, to the service platform. During specific implementation, contents of the service data report message are as follows.

| Information elements | Remarks |
|---|---|
| Identifier for terminal/gateway | Identifier for video display M2M terminal/gateway in M2M system |
| Service data | Carrying of video and/or environmental information data reported by terminal peripheral |

Step 203: The service platform receives and parses the service data report message sent by the terminal/gateway, reads service data in the message, processes the service data according to service logics to generate video display data, and stores the video display data in a local database, or covers existing video data corresponding to an identifier for the terminal/gateway in the database with the video display data. During specific implementation, a one-to-one mapping table between position area information and the identifier for the terminal/gateway can be established in the local database of the service platform. An example is taken as follows.

| Position area information | Identifier for terminal/gateway |
|---|---|
| Geographic coordinate area #1 | M2M terminal A |
| Geographic coordinate area #2 | M2M gateway a |
| ... | ... |
| Geographic coordinate area #N | M2M gateway b |
| ... | ... |

Contents of the video display data are as follows.

| Information elements | Remarks |
|---|---|
| Identifier for terminal/gateway | Identifier for video display M2M terminal/gateway in M2M system |

| Information elements | Remarks |
| --- | --- |
| Video data | Carrying of video display data generated by M2M service platform |

Wherein, the video data is a video content relevant to information regarding tourism scenic spot landscapes, climate, humanity, environment and the like generated by the service platform according to the video and/or environmental information data reported by the terminal/gateway. In addition, the video data may be a set of video data from a plurality of terminal peripherals connected to the terminal/gateway to be selected by a video display M2M application (hereinafter referred to as an application).

Step 204: After receiving a service request of a user, the application sends a video data request message to the service platform. Contents of the video data request message are as follows.

| Information elements | Remarks |
| --- | --- |
| Application port number | Application port number allocated for video display M2M application by M2M service platform |
| Service type | Indication of service type requested by video display M2M application |
| Service data | Carrying of position area information indicated by video display M2M application |

Wherein, the service type is indicative of a video display data request.

Step 205-206: The service platform receives and parses the video data request message sent by the application, recognizes the service type, retrieves the corresponding identifier for the terminal/gateway in the mapping table between the position area information and the terminal/gateway in the local database according to the position area information in the service data after passing service authentication of the video data request, searches for the corresponding video display data according to the retrieved identifier for the terminal/gateway, and sends the video display data to the application according to a video data response message. Contents of the video data response message are as follows.

| Information elements | Remarks |
| --- | --- |
| Application port number | Application port number allocated for video display M2M application by M2M service platform |
| Service type | Indication of service type in response to M2M service platform |
| Service data | Carrying of video display data fed back by M2M service platform |

Wherein, the service type is indicative of a video display data response.

The application receives and parses the video data response message sent by the service platform, extracts video data in the response message, and feeds back the video data to a service requesting user.

Figure 3:
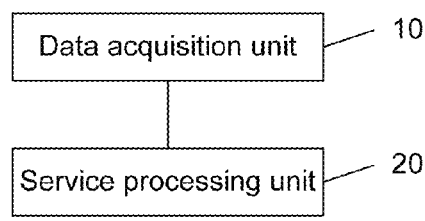
FIG. 3 is a structural diagram of an M2M service platform according to an embodiment of the disclosure.

As shown in FIG. 3, in correspondence to the above information processing method, an embodiment of the disclosure also provides an M2M service platform, which includes:

a data acquisition unit 10, configured to acquire video and/or environmental information data reported by an M2M terminal device, the video and/or environmental information data being collected by a terminal peripheral connected to the M2M terminal device according to a pre-set parameter; and a service processing unit 20, configured to perform service logic processing on the acquired video and/or environmental information data to obtain a video display content and save the video display content in a database, and further configured to search, when a data request from an M2M application server is received, the database for the video display content corresponding to the data request, and feed back the video display content to the M2M application server.

Wherein, the video and/or environmental information data reported by the M2M terminal device is carried in a service data report message, and the service data report message further contains an identifier for the M2M terminal device reporting the video and/or environmental information data.

Wherein, the service processing unit 20 is configured to maintain a first mapping relationship between position area information and the identifier for the M2M terminal device and a second mapping relationship between the saved video display content and the identifier for the M2M terminal device in the database, search, when the data request from the M2M application server is received, the database for the first mapping relationship according to the position area information in the data request to obtain the identifier for the M2M terminal device, corresponding to the position area information, and search the database for the second mapping relationship according to the found identifier for the M2M terminal device to obtain the video display content corresponding to the identifier for the M2M terminal device.

It is important to note that the data acquisition unit 10 and the service processing unit 20 can be implemented by a Central Processing Unit (CPU), a Micro Processing Unit (MPU), a Digital Signal Processor (DSP) or a Field Programmable Gate Array (FPGA) of the M2M service platform.

Figure 4:
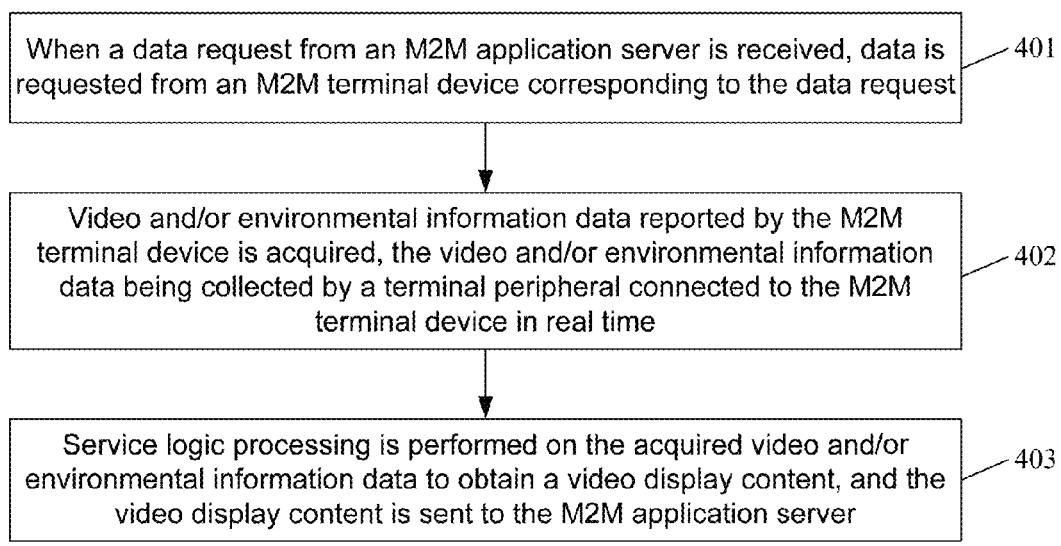
FIG. 4 is a flowchart of another M2M-based information processing method according to an embodiment of the disclosure.

As shown in FIG. 4, another M2M-based information processing method provided by an embodiment of the disclosure mainly includes the steps as follows.

Step 401: When a data request from an M2M application server is received, data is requested from an M2M terminal device corresponding to the data request.

An executive body of the embodiment is an M2M service platform, and therefore Step 401 is also described as that: after receiving the data request from the M2M application server, the M2M service platform requests the data from the M2M terminal device corresponding to the data request.

Wherein, position area information is included in the data request from the M2M application server, and correspondingly, the step that the data is requested from the M2M terminal device corresponding to the data request includes that:

a database is searched for a first mapping relationship, between the position area information and an identifier for the M2M terminal device, maintained in the database according to the position area information in the data request to obtain the identifier for the M2M terminal device, corresponding to the position area information; and the data is requested from the M2M terminal device corresponding to the found identifier for the M2M terminal device.

Step 402: Video and/or environmental information data reported by the M2M terminal device is acquired, the video and/or environmental information data being collected by a terminal peripheral connected to the M2M terminal device in real time.

The executive body of the embodiment is the M2M service platform, and therefore Step 402 is also described as that: the M2M service platform acquires video and/or environmental information data reported by the M2M terminal device.

Step 403: Service logic processing is performed on the acquired video and/or environmental information data to obtain a video display content, and the video display content is fed back to the M2M application server.

The executive body of the embodiment is the M2M service platform, and therefore Step 403 is also described as that: the M2M service platform performs service logic processing on the acquired video and/or environmental information data to obtain the video display content, and feeds back the video display content to the M2M application server.

Wherein, the video and/or environmental information data reported by the M2M terminal device is carried in a service data response message, and the service data response message further contains the identifier for the M2M terminal device reporting the video and/or environmental information data; and the method further includes that:

the video display content obtained by service logic processing and the identifier for the M2M terminal device are correspondingly stored as a second mapping relationship in the database.

Figure 5:
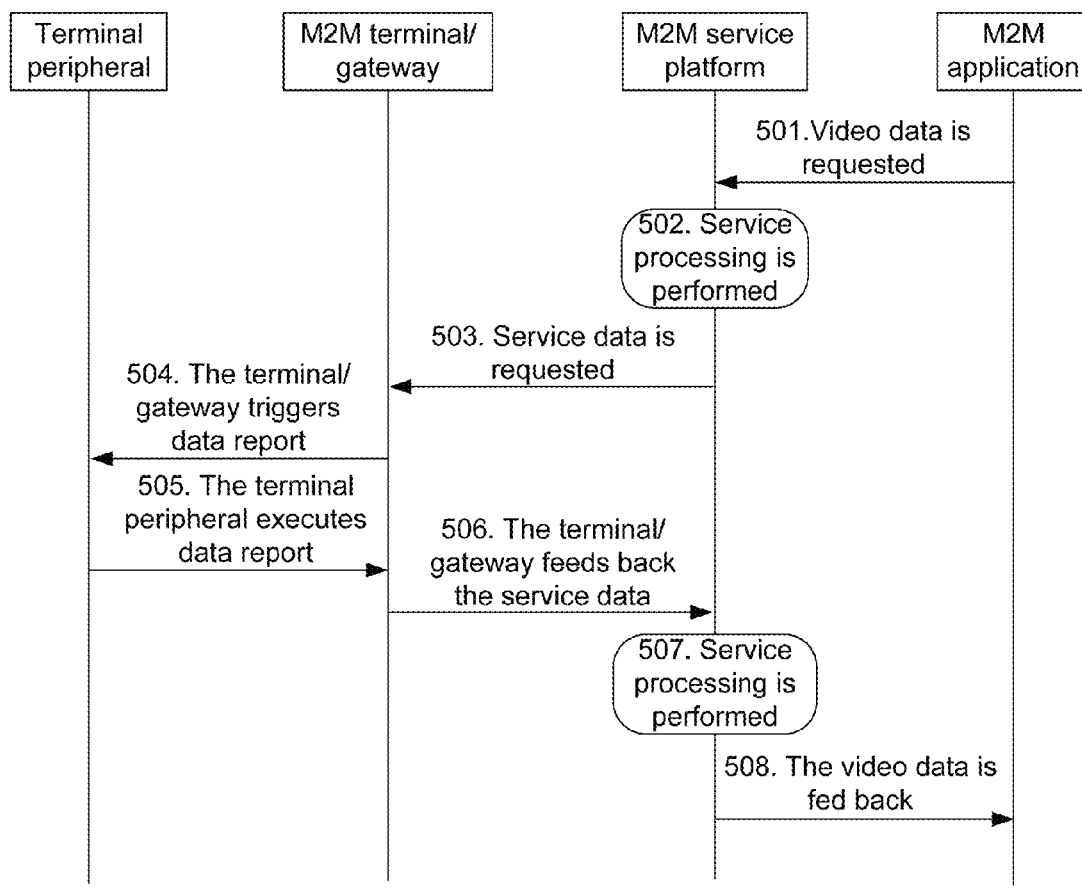
FIG. 5 is a flowchart of an information processing method according to an embodiment 2 of the disclosure.

The above information processing method is specifically explained below with reference to FIG. 5. As shown in FIG. 5, the method mainly includes the steps as follows.

Step 501: After receiving a service request of a user, an application sends a video data request message to a service platform. Contents of the video data request message are as follows.

| Information elements | Remarks |
| --- | --- |
| Application port number | Application port number allocated for video display M2M application by M2M service platform |
| Service type | Indication of service type requested by video display M2M application |
| Service data | Carrying of position area information indicated by video display M2M application |

Wherein, the service type is indicative of a video display data request.

Step 502-503: The service platform receives and parses the video data request message sent by the application, recognizes the service type, retrieves a corresponding identifier for a terminal/gateway in a mapping table between the position area information and the terminal/gateway in a local database according to the position area information in the service data after passing service authentication of a video data request, and sends a service data request message to the corresponding terminal/gateway according to the retrieved identifier for the terminal/gateway. Contents of the service data request message are as follows.

| Information elements | Remarks |
| --- | --- |
| Identifier for terminal/gateway | Identifier for video display M2M terminal/gateway in M2M system |
| Service type | Indication of service type requested by M2M service platform |
| Service data | Carrying of position area information indicated by video display M2M application |

Wherein, the service type is indicative of a video display service data request.

Step 504: The terminal/gateway receives and parses the video data request message service sent by the service platform, recognizes the service type, reads the position area information in the service data, retrieves a corresponding identifier for a terminal peripheral according to geographic coordinates indicated by the position area information, and triggers the corresponding terminal peripheral corresponding to the identifier for the terminal peripheral to execute data collection/report. During specific implementation, a mapping relationship table between the position area information and the identifier for the terminal peripheral can be established in the local database of the terminal/gateway. An example is taken as follows.

| Position area information | Identifier for terminal peripheral |
| --- | --- |
| Geographic coordinate area #1 | Terminal peripheral A, terminal peripheral b |
| Geographic coordinate area #2 | Terminal peripheral B |
| ... | ... |

Step 505: After receiving a trigger message of the terminal/gateway, the terminal peripheral executes collection of video and/or environmental information data, and reports the collected data to the terminal/gateway.

Step 506: The terminal/gateway receives the video and/or environmental information data reported by the terminal peripheral, packages the data in a service data response message, and namely sends the video and/or environmental information data, serving as a cell of the service data response message, to the service platform. Contents of the service data response message are as follows.

| Information elements | Remarks |
| --- | --- |
| Identifier for terminal/gateway | Identifier for video display M2M terminal/gateway in M2M system |
| Service type | Indication of service type in response to video display M2M terminal/gateway |
| Service data | Carrying of video and/or environmental information data reported by terminal peripheral |

Wherein, the service type is indicative of a video display service data response.

Step 507-508: The service platform receives and parses the service data response message fed back by the terminal/gateway, reads service data in the message, processes the service data according to service logics to generate video display data, and stores the video display data in the local database, or covers existing video data corresponding to the identifier for the terminal/gateway in the database with the video display data. Meanwhile, the generated video display data is fed back to the application by means of a video data response message.

The application receives and parses the video data response message fed back by the service platform, extracts video data in the response message, and feeds back the video data to a service requesting user.

Figure 6:
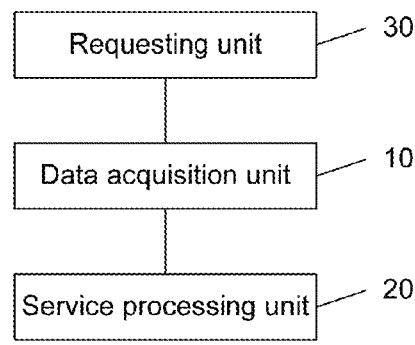
FIG. 6 is a structural diagram of another M2M service platform according to an embodiment of the disclosure.

As shown in FIG. 6, in correspondence to the above information processing method shown in FIG. 4 and FIG. 5, an embodiment of the disclosure also provides an M2M service platform, which includes:

a requesting unit 30, configured to request, when a data request from an M2M application server is received, data from an M2M terminal device corresponding to the data request;

a data acquisition unit 10, configured to acquire video and/or environmental information data reported by the M2M terminal device, the video and/or environmental information data being collected by a terminal peripheral connected to the M2M terminal device in real time; and a service processing unit 20, configured to perform service logic processing on the obtained video and/or environmental information data to obtain a video display content, and feed back the video display content to the M2M application server.

Wherein, position area information is included in the data request from the M2M application server, and correspondingly, the requesting unit 30 is configured to search a database for a first mapping relationship, between the position area information and an identifier for the M2M terminal device, maintained in the database according to the position area information in the data request to obtain the identifier for the M2M terminal device, corresponding to the position area information, and request the data from the M2M terminal device corresponding to the found identifier for the M2M terminal device.

Wherein, the video and/or environmental information data reported by the M2M terminal device is carried in a service data response message, and the service data response message further contains the identifier for the M2M terminal device reporting the video and/or environmental information data; and the service processing unit 20 is configured to correspondingly store the video display content obtained by service logic processing and the identifier for the M2M terminal device as a second mapping relationship in the database.

It is important to note that the data acquisition unit 10, the service processing unit 20 and the requesting unit 30 can be implemented by the CPU, the MPU, the DSP or the FPGA of the M2M service platform.

The embodiments of the disclosure achieve acquisition of real-time video and environmental information data, so as to provide real-time and rich video display service regarding tourism scenic spots for the user.

An embodiment of the disclosure also provides a computer readable storage medium which may include a set of instructions, the instructions being configured to execute an M2M-based information processing method according to an embodiment of the disclosure.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above is only the preferred embodiments of the disclosure and is not intended to limit the protection scope of the disclosure.

What is claimed is:

1. A Machine-to-Machine/Man (M2M)-based information processing method, comprising:
    acquiring video and/or environmental information data reported by an M2M terminal device, the video and/or environmental information data being collected by a terminal peripheral connected to the M2M terminal device according to a pre-set parameter;
    wherein the video and/or environmental information data reported by the M2M terminal device is carried in a service data report message, and the service data report message further contains an identifier for the M2M terminal device reporting the video and/or environmental information data,
    parsing the service data report message;
    extracting the video and/or environmental information data from the service data report message;
    performing service logic processing on the acquired video and/or environmental information data to obtain a video display content, and saving the video display content in a database; and
    searching, when a data request from an M2M application server is received, the database for the video display content corresponding to the data request, and feeding back the video display content to the M2M application server;
    the method further comprising: maintaining a first mapping relationship between position area information and the identifier for the M2M terminal device and a second mapping relationship between the saved video display content and the identifier for the M2M terminal device in the database, wherein the step of searching the database for the video display content corresponding to the data request comprises:

searching the database for the first mapping relationship according to the position area information in the data request to obtain the identifier for the M2M terminal device, corresponding to the position area information, and searching the database for the second mapping relationship according to the found identifier for the M2M terminal device to obtain the video display content corresponding to the identifier for the M2M terminal device.

2. The M2M-based information processing method according to claim 1, wherein the position area information is contained in the data request from the M2M application server.

3. A Machine-to-Machine/Man (M2M)-based information processing method, comprising:

requesting, when a data request from an M2M application server is received, data from an M2M terminal device corresponding to the data request;

acquiring video and/or environmental information data reported by the M2M terminal device, the video and/or environmental information data being collected by a terminal peripheral connected to the M2M terminal device in real time; and wherein the video and/or environmental information data reported by the M2M terminal device is carried in a service data response message, and the service data response message further contains the identifier for the M2M terminal device reporting the video and/or environmental information data, parsing the service data report message, extracting the video and/or environmental information data from the service data report message, performing service logic processing on the acquired video and/or environmental information data to obtain a video display content, and feeding back the video display content to the M2M application server, wherein the step of requesting the data from the M2M terminal device corresponding to the data request comprises:

searching a database for a first mapping relationship, between position area information and an identifier for the M2M terminal device, maintained in the database according to the position area information in the data request to obtain the identifier for the M2M terminal device, corresponding to the position area information; and requesting the data from the M2M terminal device corresponding to the found identifier for the M2M terminal device.

4. The M2M-based information processing method according to claim 3, wherein the position area information is contained in the data request from the M2M application server.

5. The M2M-based information processing method according to claim 4, the method further comprising:

correspondingly storing the video display content obtained by service logic processing and the identifier for the M2M terminal device as a second mapping relationship in the database.

6. The M2M-based information processing method according to claim 3, the method further comprising:

correspondingly storing the video display content obtained by service logic processing and the identifier for the M2M terminal device as a second mapping relationship in the database.

7. A Machine-to-Machine/Man (M2M) service platform, comprising:

a data acquisition unit, configured to acquire video and/or environmental information data reported by an M2M terminal device, the video and/or environmental information data being collected by a terminal peripheral connected to the M2M terminal device according to a pre-set parameter;

wherein the video and/or environmental information data reported by the M2M terminal device is carried in a service data report message, and the service data report message further contains an identifier for the M2M terminal device reporting the video and/or environmental information data, a service processing unit, configured to parse the service data report message, extract the video and/or environmental information data from the service data report message, perform service logic processing on the acquired video and/or environmental information data to obtain a video display content and save the video display content in a database, and further configured to search, when a data request from an M2M application server is received, the database for the video display content corresponding to the data request, and feed back the video display content to the M2M application server, wherein the service processing unit is configured to maintain a first mapping relationship between position area information and the identifier for the M2M terminal device and a second mapping relationship between the saved video display content and the identifier for the M2M terminal device in the database, search, when the data request from the M2M application server is received, the database for the first mapping relationship according to the position area information in the data request to obtain the identifier for the M2M terminal device, corresponding to the position area information, and search the database for the second mapping relationship according to the found identifier for the M2M terminal device to obtain the video display content corresponding to the identifier for the M2M terminal device.

8. A Machine-to-Machine/Man (M2M) service platform, comprising:

a requesting unit, configured to request, when a data request from an M2M application server is received, data from an M2M terminal device corresponding to the data request;

a data acquisition unit, configured to acquire video and/or environmental information data reported by the M2M terminal device, the video and/or environmental information data being collected by a terminal peripheral connected to the M2M terminal device in real time;

wherein the video and/or environmental information data reported by the M2M terminal device is carried in a service data response message, and the service data response message further contains the identifier for the M2M terminal device reporting the video and/or environmental information data, a service processing unit, configured to parse the service data report message, extract the video and/or environmental information data from the service data report message, perform service logic processing on the obtained video and/or environmental information data to obtain a video display content, and feed back the video display content to the M2M application server, wherein the requesting unit is configured to search a database for a first mapping relationship, between position area information and an identifier for the M2M terminal device, maintained in the database according to the position area information in the data request to obtain the identifier for the M2M terminal device, corresponding to the position area information, and request the data from the M2M terminal device corresponding to the found identifier for the M2M terminal device.

9. The M2M service platform according to claim 8, wherein position area information is contained in the data request from the M2M application server.

10. The M2M service platform according to claim 9, wherein
the service processing unit is configured to correspondingly store the video display content obtained by service logic processing and the identifier for the M2M terminal device as a second mapping relationship in the database.

11. The M2M service platform according to claim 8, wherein
the service processing unit is configured to correspondingly store the video display content obtained by service logic processing and the identifier for the M2M terminal device as a second mapping relationship in the database.

12. A non-transitory computer readable storage medium, comprising a set of instructions, the instructions being configured to execute a Machine-to-Machine/Man (M2M)-based information processing method comprising:

acquiring video and/or environmental information data reported by an M2M terminal device, the video and/or environmental information data being collected by a terminal peripheral connected to the M2M terminal device according to a pre-set parameter;

wherein the video and/or environmental information data reported by the M2M terminal device is carried in a service data report message, and the service data report message further contains an identifier for the M2M terminal device reporting the video and/or environmental information data, parsing the service data report message;

extracting the video and/or environmental information data from the service data report message;

performing service logic processing on the acquired video and/or environmental information data to obtain a video display content, and saving the video display content in a database; and searching, when a data request from an M2M application server is received, the database for the video display content corresponding to the data request, and feeding back the video display content to the M2M application server, the method further comprising: maintaining a first mapping relationship between position area information and the identifier for the M2M terminal device and a second mapping relationship between the saved video display content and the identifier for the M2M terminal device in the database, wherein the step of searching the database for the video display content corresponding to the data request comprises:

searching the database for the first mapping relationship according to the position area information in the data request to obtain the identifier for the M2M terminal device, corresponding to the position area information, and searching the database for the second mapping relationship according to the found identifier for the M2M terminal device to obtain the video display content corresponding to the identifier for the M2M terminal device.

13. A non-transitory computer readable storage medium, comprising a set of instructions, the instructions being configured to execute a Machine-to-Machine/Man (M2M)-based information processing method comprising:

requesting, when a data request from an M2M application server is received, data from an M2M terminal device corresponding to the data request;

acquiring video and/or environmental information data reported by the M2M terminal device, the video and/or environmental information data being collected by a terminal peripheral connected to the M2M terminal device in real time;

wherein the video and/or environmental information data reported by the M2M terminal device is carried in a service data report message, and the service data report message further contains an identifier for the M2M terminal device reporting the video and/or environmental information data, parsing the service data report message;

extracting the video and/or environmental information data from the service data report message;

performing service logic processing on the acquired video and/or environmental information data to obtain a video display content, and feeding back the video display content to the M2M application server, wherein the step of requesting the data from the M2M terminal device corresponding to the data request comprises:

searching a database for a first mapping relationship, between position area information and an identifier for the M2M terminal device, maintained in the database according to the position area information in the data request to obtain the identifier for the M2M terminal device, corresponding to the position area information; and requesting the data from the M2M terminal device corresponding to the found identifier for the M2M terminal device.

* * * * *